United States Patent
Youn et al.

(10) Patent No.: US 9,902,854 B2
(45) Date of Patent: *Feb. 27, 2018

(54) POLYAMIDE COMPOSITE RESIN COMPOSITION FOR FUEL FILLER PIPE

(71) Applicants: Hyundai Motor Company, Seoul (KR); SHINIL CHEMICAL INDUSTRY CO., LTD., Ansan-si, Gyeonggi-do (KR); Korea Fuel-Tech Corporation, Anseong-si, Gyeonggi-so (KR)

(72) Inventors: Jee Young Youn, Incheon (KR); Dong Yol Ryu, Jecheon-si (KR); Dong Chul Lee, Hwaseong-si (KR); Bo Ram Kwon, Namyangju-si (KR); Ki Hong Kim, Anseong-si (KR); Keum Suk Seo, Ansan-si (KR); Cheol Kyu Choi, Yongin-si (KR)

(73) Assignees: HYUNDAI MOTOR COMPANY, Seoul (KR); SHINIL CHEMICAL INDUSTRY CO., LTD., Ansan-si, Gyeonggi-Do (KR); KOREA FUEL-TECH CORPORATION, Anseong-si, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/220,031

(22) Filed: Jul. 26, 2016

(65) Prior Publication Data
US 2017/0166745 A1    Jun. 15, 2017

(30) Foreign Application Priority Data
Dec. 14, 2015 (KR) .................. 10-2015-0178634

(51) Int. Cl.
C08L 77/02 (2006.01)
B29B 7/20 (2006.01)
(Continued)

(52) U.S. Cl.
CPC ............... *C08L 77/02* (2013.01); *B29B 7/20* (2013.01); *B29B 7/88* (2013.01); *B29B 13/065* (2013.01); *B29B 7/002* (2013.01); *B29B 9/06* (2013.01); *B29K 2077/00* (2013.01); *B60K 15/04* (2013.01); *B60K 2015/03493* (2013.01); *B60K 2015/0458* (2013.01); *C08L 2201/14* (2013.01);
(Continued)

(58) Field of Classification Search
CPC ... C08L 77/02; B29B 7/20; B29B 7/88; B29B 9/06; B29B 13/065
See application file for complete search history.

(56) References Cited

U.S. PATENT DOCUMENTS

2011/0217495 A1    9/2011    Stoeppelmann et al.

FOREIGN PATENT DOCUMENTS

| EP | 1517789 A1 | 9/2011 |
| JP | 4542035 B2 | 9/2010 |

(Continued)

*Primary Examiner* — John E Uselding
(74) *Attorney, Agent, or Firm* — McDermott Will & Emery LLP

(57) ABSTRACT

A polyamide composite resin composition for a fuel filler pipe includes 41 to 77% by weight of polyamide 6, 5 to 15% by weight of m-xylenediamine (MXD)-based modified nylon, 14 to 30% by weight of a maleic anhydride-grafted ethylene-octene copolymer, a maleic anhydride-grafted ethylene-propylene-diene monomer, or a mixture thereof, and 3 to 10% by weight of mixed clay.

11 Claims, 3 Drawing Sheets

(51) Int. Cl.
  *B29B 7/88* (2006.01)
  *B29B 13/06* (2006.01)
  *B29B 9/06* (2006.01)
  *B29K 77/00* (2006.01)
  *B60K 15/04* (2006.01)
  *B60K 15/03* (2006.01)
  *B29B 7/00* (2006.01)
  *F26B 17/00* (2006.01)

(52) U.S. Cl.
  CPC ....... *C08L 2203/18* (2013.01); *C08L 2205/03* (2013.01); *F26B 17/00* (2013.01)

(56) References Cited

FOREIGN PATENT DOCUMENTS

| | | |
|---|---|---|
| JP | 2012-136621 A | 7/2012 |
| KR | 10-2006-0063593 A | 6/2006 |
| KR | 10-2006-0120548 A | 11/2006 |
| KR | 10-0689210 B1 | 3/2007 |
| KR | 10-1002050 B1 | 12/2010 |
| KR | 10-2011-0012430 A | 2/2011 |
| KR | 10-1082492 B1 | 11/2011 |
| KR | 10-2013-0108453 A | 10/2013 |
| KR | 10-1693635 B1 | 1/2017 |

POLYAMIDE COMPOSITE RESIN COMPOSITION FOR FUEL FILLER PIPE

CROSS-REFERENCE TO RELATED APPLICATION

This application claims under 35 U.S.C. § 119(a) the benefit of priority to Korean Patent Application No. 10-2015-0178634, filed on Dec. 14, 2015 with the Korean Intellectual Property Office, the entire contents of which are incorporated herein by reference.

TECHNICAL FIELD

The present disclosure relates to a polyamide composite resin composition for a fuel filler pipe. More particularly, the present disclosure relates to a polyamide composite resin composition for a fuel filler pipe which may be easily blow-molded into a composite resin for a fuel filler pipe and has superior mechanical properties.

BACKGROUND

Fuel filler pipes face many technical challenges such as tougher regulations on evaporative gas and satisfactory compatibility with a lightweight material and biofuel according to $CO_2$ regulations. Plastic as a material of fuel filler pipes is suitable as a lightweight material, but barrier properties against alcoholic gas according to a change in a composition of gasoline fuel due to addition of bio-ethanol are problematic. Since component materials of conventional fuel tank injection parts include nylon and rubber, the materials have superior barrier properties against conventional gasoline, but weak barrier properties against alcohol.

In addition, there is a need for development of materials having superior barrier properties due to strengthening of laws and regulations on evaporative gas. The permissible level of evaporative gas is 10 mg or less (F/Neck Ass'y 30 mg) with respect to E0 in Korea, 100 mg (EURO IV) with respect to E10 in Europe, and 2.5 mg (EPA Regulation Level III) with respect to E10 in North America.

Meanwhile, since high density polyethylene (HDPE) conventionally used as a resin for blow molding has a fuel barrier property of 68 g·mm/m²/day which is not excellent, HDPE may be used as a part of a multilayered structure with an ethylene vinyl alcohol copolymer (EVOH). However, expensive multiple extruders should be used to form a multilayered structure, and a satisfactory design for blow extrudability is required.

Accordingly, nylon-based resins having superior barrier properties may be used. However, polyamide 6 among nylon-based resins has superior barrier properties against gasoline but unsatisfactory low-temperature impact properties.

Korean Patent No. 1002050 discloses a multilayered article having barrier properties including a nanoscale composite blend layer having barrier properties where a polyolefin resin is dispersed in a continuous phase of a nanoscale composite of a polyolefin layer and a resin having barrier properties/layered clay compound. However, a specific screw for forming a polyamide dispersion layer in a polyethylene resin is necessary and it is difficult to efficiently control morphology upon blow molding.

In addition, Korean Patent Application Pub. No. 2011-0012430 discloses a resin selected from the group consisting of polyamide resin, polyolefin resin, polyolefin-based thermoplastic elastic body resin, and the like, and a conductive polyamide complex composition including carbon black and carbon nanotubes. However, it is very difficult to control a polyamide dispersion layer in blow molding, and there are disadvantages such as decreased gas and gasoline blocking due to the addition of a large amount of a compatibilizer to a polyolefin resin and difficulty in morphology control.

In addition, US Patent Application Pub. No. 2011-0217495 discloses a thermoplastic molding material composed of polyamide-6, a nanofiller, a fibrous filler, an impact regulator and a blow-molding material including polyamide-66. However, impact resistance is decreased and elongation stress increases due to the addition of inorganic material (fibrous filler), and thus, elongation properties are decreased, whereby blow moldability becomes poor.

In addition, Korean Patent Application Pub. No. 2006-0120548 discloses an MXD-6 nano resin composition having superior gas barrier properties prepared by blending an immobilized inorganic layered clay compound and m-xylenediamine (MXD-6) as a crystalline polyamide resin. When an MXD-6 nano blend is prepared, preparation costs increase and heat stability of a layered clay compound is low, whereby molding is difficult due to gas generation, etc. upon blow molding. In addition, it is difficult to secure impact resistance required in components of an injection part of a fuel tank using only an MXD-6 or MXD-6 nano blend composition.

Therefore, there is a need for development of a material which may be easily blow-molded, may enhance impact resistance, tensile strength and gas barrier properties, and may be applied to components of an injection part of a fuel tank.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art.

It is an object of the present disclosure to provide a polyamide composite resin composition for a fuel filler pipe which may be easily blow-molded and exhibits superior mechanical properties such as superior low-temperature impact resistance and tensile strength.

It is another object of the present disclosure to provide a polyamide composite resin composition for a fuel filler pipe which may greatly enhance gas barrier properties against gasoline and a mixed fuel including gasoline and alcohol.

Objects of the present disclosure are not limited to the aforementioned objects. Objects of the present disclosure will be clarified through the following description and will be accomplished by means disclosed in the accompanying claims and combinations thereof.

In order to accomplish the aforementioned objections of the present disclosure, the following compositions may be included.

A polyamide composite resin composition for a fuel filler pipe according to the present disclosure may include 41 to 77% by weight of polyamide 6; 5 to 15% by weight of m-xylenediamine (MXD)-based modified nylon; 14 to 30% by weight of a maleic anhydride-grafted ethylene-octene copolymer, a maleic anhydride-grafted ethylene-propylene-diene monomer, or a mixture thereof; and 3 to 10% by weight of mixed clay.

In a preferred embodiment of the present disclosure, the m-xylenediamine (MXD)-based modified nylon may be one or more selected from the group consisting of m-xylenediamine 6 nylon, aromatic nylon and amorphous nylon.

In a preferred embodiment of the present disclosure, the mixed clay may be immobilization-pretreated through mixing with two or more selected from the group consisting of tabular montmorillonite, hectorite, saponite and vermiculite.

In a preferred embodiment of the present disclosure, pre-treatment into an organic material including one or more functional groups selected from the group consisting of primary to quaternary ammonium, phosphonium, maleate, succinate, acrylate, benzylic hydrogen, dimethyl distearyl ammonium and oxazoline is performed in the immobilization pretreatment.

The polyamide composite resin composition for a fuel filler pipe according to the present disclosure may further include one or more selected from the group consisting of stearic acid, stearyl alcohol, and stearamide in an amount of 0.3 to 1.0% by weight.

The polyamide composite resin composition for a fuel filler pipe according to the present disclosure may further include one or more thickeners selected from the group consisting of vinyl, epoxy, methacryloxy, amino, mercapto, acryloxy, isocyanate, styryl and alkoxy oligomers in an amount of 0.3 to 1.0% by weight.

The polyamide composite resin composition for a fuel filler pipe according to the present disclosure may further include one or more heat stabilizers selected from the group consisting of sodium halides, potassium halides, and lithium halides in an amount of 0.3 to 1.0% by weight.

The polyamide composite resin composition for a fuel filler pipe according to the present disclosure may further include one or more heat stabilizers selected from the group consisting of cuprous halides, and cuprous iodine compounds in an amount of 0.3 to 1.0% by weight.

The polyamide composite resin composition for a fuel filler pipe according to the present disclosure may further include one or more heat stabilizers selected from the group consisting of hindered phenols, hydroquinones, and aromatic amines in an amount of 0.3 to 1.0% by weight.

In a preferred embodiment of the present disclosure, a maleic acid-based resin or an epoxy-based resin may be preferably included in an amount of 0.01 to 15% by weight in the polyamide 6 so as to increase a molecular weight of polyamide.

In a preferred embodiment of the present disclosure, aromatic-based nylon may be included in the polyamide 6 in an amount of 0.01 to 15% by weight so as to enhance barrier properties.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not imitative of the present disclosure, and wherein.

Figure 1:
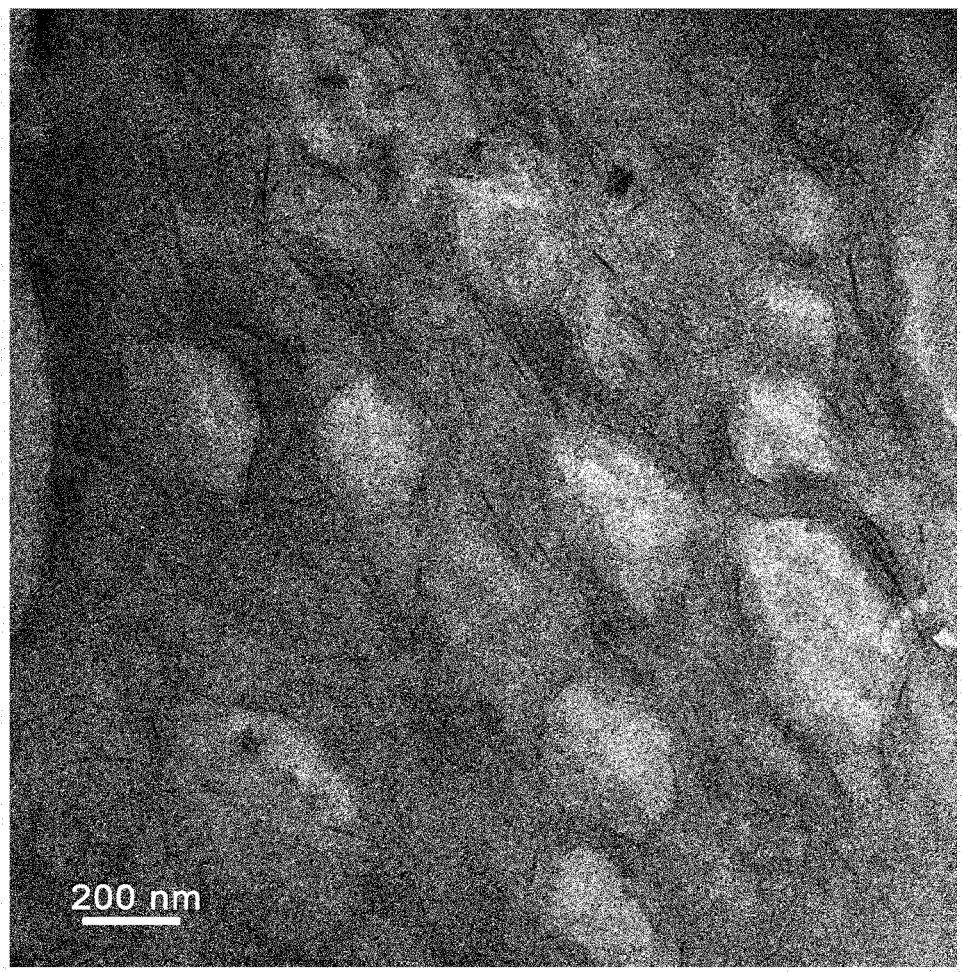
FIG. 1 illustrates a transmission electron microscope (TEM) image of a polyamide composite resin prepared according to Example 1 of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

In the description of the present disclosure, detailed explanations of known configurations and functions are omitted when it is deemed that they may unnecessarily obscure the essence of the disclosure. The expression "comprises" or "includes" means that other constituents may be further included unless otherwise mentioned.

A polyamide composite resin composition for a fuel filler pipe of the present disclosure may include 41 to 77% by weight of polyamide 6; 5 to 15% by weight of m-xylenediamine (MXD)-based modified nylon; 14 to 30% by weight of a maleic anhydride-grafted ethylene-octene copolymer, a maleic anhydride-grafted ethylene-propylene-diene monomer or a mixture thereof; and 3 to 10% by weight of mixed clay.

According to an embodiment of the present disclosure, the polyamide 6, as nylon 6, including diamine and dicarboxylic acid may have superior barrier properties against gasoline of 5 g·mm/m$^2$/day, and superior mechanical characteristics, chemical resistance and heat resistance. In addition, the polyamide 6 may be included in an amount of 41 to 77% by weight in the polyamide composite resin composition for a fuel filler pipe of the present disclosure. When the content of the polyamide 6 is less than 41% by weight, chemical resistance, heat resistance and fuel barrier properties may be decreased. When the content of the polyamide 6 is greater than 77% by weight, low-temperature impact resistance and blow-molding properties may be decreased.

In addition, a maleic acid-based resin or an epoxy-based resin may be added to the polyamide 6 to increase the molecular weight of the polyamide 6, and polyamide 6 having an RV of 2.70 or more in a sulfuric acid solution may be used as the polyamide 6 of the present disclosure. Since blow molding may not be performed due to problems of liquidity of a parison upon extrusion blow molding due to liquidity increase when RV 2.70 is used, the maleic acid-based resin or epoxy-based resin may be added to increase the molecular weight of polyamide. The added resin may control the molecular weight through a —NH functional group of a polyamide terminal and an extrusion reaction with an epoxy-based resin or a maleic acid-based resin. To increase the molecular weight, the maleic acid-based resin or the epoxy-based resin is preferably included in an amount of 0.01 to 15% by weight in the polyamide 6. As the polyamide 6, Grivoly BRZ 350 manufactured by EMS or Technyl C544 manufactured from Rhodia may be used. In addition, the polyamide 6 may partially include an aromatic-based nylon having excellent barrier properties. So as to enhance barrier properties, the aromatic-based nylon may be included in an amount of 0.01 to 15% by weight in the polyamide 6.

According to an embodiment of the present disclosure, the m-xylenediamine (MXD)-based modified nylon may be a material forming a dispersion layer and is a modified nylon having MI of 0.5 at 275° C. In addition, the m-xylenediamine (MXD)-based modified nylon may form a laminar dispersion layer when mixed with polyamide, thereby having superior gas barrier properties. Since such a dispersion layer may be sensitively changed according to molding temperature, it may be necessary to set a molding temperature to 275° C. or less. The m-xylenediamine-based modified nylon may be one or more selected from the group consisting of m-xylenediamine 6 nylon, aromatic nylon and amorphous nylon. In addition, the m-xylenediamine (MXD)-based modified nylon may be included in an amount of 5 to 15% by weight in the polyamide composite resin composition for a fuel filler pipe. In particular, when the content of the m-xylenediamine (MXD)-based modified nylon is less than 5% by weight, a laminar structure for increasing gas barrier properties against gasoline and a mixed fuel including gasoline and alcohol may be poorly formed, whereby gas barrier properties may be decreased. When the content of the m-xylenediamine (MXD)-based modified nylon is greater than 15% by weight, mechanical properties may be decreased.

According to an embodiment of the present disclosure, the polyamide composite resin composition for a fuel filler pipe may include a maleic anhydride-grafted ethylene-octene copolymer, a maleic anhydride-grafted ethylene-propylene-diene monomer, or a mixture thereof. The maleic anhydride-grafted ethylene-octene copolymer, the maleic anhydride-grafted ethylene-propylene-diene monomer, or the mixture thereof is a kind of thermoplastic rubber elastomer (thermoplastic olefin: TPO). In particular, the thermoplastic elastic body may be added to enhance dispersibility through reaction with a chain of the polyamide 6. In addition, since pore size may be decreased through a dispersion force increase of the thermoplastic elastic body, compared with conventional ethylene-propylene-diene monomer (EPDM), impact resistance may be secured using a small amount of the thermoplastic elastic body. In addition, a laminar structure that blocks permeation of gas is not disturbed.

According to an embodiment of the present disclosure, the maleic anhydride-grafted ethylene-octene copolymer, the maleic anhydride-grafted ethylene-propylene-diene monomer, or the mixture thereof may be dispersed in a size of 1 to 10 µm using a twin-screw extruder. In addition, the maleic anhydride-grafted ethylene-octene copolymer, the maleic anhydride-grafted ethylene-propylene-diene monomer, or the mixture thereof may be included in an amount of 14 to 30% by weight in the polyamide composite resin composition for a fuel filler pipe. In particular, when the content of the maleic anhydride-grafted ethylene-octene copolymer, the maleic anhydride-grafted ethylene-propylene-diene monomer, or the mixture thereof is less than 14% by weight, low-temperature impact resistance effects may be low. When the content of the maleic anhydride-grafted ethylene-octene copolymer, the maleic anhydride-grafted ethylene-propylene-diene monomer, or the mixture thereof is greater than 30% by weight, impact reinforcement properties may be decreased.

According to an embodiment of the present disclosure, the mixed clay is an inorganic filler for reinforcing gas barrier properties of a matrix resin. The mixed clay may be microparticles having a size of 0.1 to 10 nm. The mixed clay may be a mixed clay wherein two or more clays selected from the group consisting of tabular montmorillonite, hectorite, saponite and vermiculite are mixed and immobilization-pretreated. The immobilization-pretreated mixed clay may be prepared by pre-treating with an organic material after mixing two or more clays in a reactor upon clay preparation. The organic material may include a functional group selected from the group consisting of primary to quaternary ammonium, phosphonium, maleate, succinate, acrylate, benzylic hydrogen, dimethyl distearyl ammonium and oxazoline. The mixed clay may be pretreated with an organic substance with an alkylammonium function group as a functional group. Since such a mixed clay may have better dispersibility than a single clay, an organic material upon immobilization pretreatment may be used in a small amount and thus heat stability may be enhanced in a nanoscale composite, whereby a gas generation problem upon blow molding may be addressed.

The mixed clay may be used in an amount of 3 to 10% by weight. When the content of the mixed clay is less than 3% by weight, gas barrier effects may be slight. When the content of the mixed clay is greater than 10% by weight, impact performance may be greatly decreased due to a rapid increase of tensile strength and flexural strength, and elongation may decrease.

According to an embodiment of the present disclosure, the polyamide composite resin composition for a fuel filler pipe may further include 0.3 to 1.0% by weight of a heat stabilizer. In particular, the heat stabilizer may provide long-term heat resistance to components, and may include one or more materials selected from the group consisting of Group I metal halides on a periodic table such as sodium halides, potassium halides and lithium halides, cuprous halides, and cuprous iodine compounds. In addition, the heat stabilizer may be one or more selected from the group consisting of hindered phenols, hydroquinones and aromatic amines.

In addition, according to an embodiment of the present disclosure, the polyamide composite resin composition for a fuel filler pipe may further include one or more materials selected from the group consisting of stearic acid, stearyl alcohol, and stearamide in an amount of 0.3 to 1.0% by weight. The one or more materials selected from the group consisting of stearic acid, stearyl alcohol, and stearamide may function as an interior lubricant to induce smooth flow during injection molding.

According to an embodiment of the present disclosure, the polyamide composite resin composition for a fuel filler pipe may further include 0.3 to 1.0% by weight of thickener. The thickener may provide a viscosity suitable for blow molding by increasing viscosity of nylon at extrusion temperature. The thickener may be one or more selected from the group consisting of vinyl, epoxy, methacryloxy, amino, mercapto, acryloxy, isocyanate, styryl and alkoxy oligomers. In addition, when the content of the thickener is less than 0.3% by weight, viscosity may not be increased. When the content of the thickener is greater than 1.0% by weight, blow-molding properties may be decreased.

According to an embodiment of the present disclosure, the polyamide composite resin composition for a fuel filler pipe may further include 0.1 to 1.0% by weight of filler. The filler may be a carbon black masterbatch or the like.

Accordingly, the polyamide composite resin composition for a fuel filler pipe according to the present disclosure may maintain extrusion temperature of a kneading process to 275° C. or less. When extrusion temperature is greater than 275° C., a domain size becomes too small and barrier properties may be decreased. A kneaded polyamide composite material was pelletized through a cutter and then dried using a humidifying dryer.

TABLE 1

| Classification | Comparative Examples | | | | | | | | | Examples | | |
|---|---|---|---|---|---|---|---|---|---|---|---|---|
| | 1 | 2 | 3 | 4 | 5 | 6 | 7 | 8 | 9 | 1 | 2 | 3 |
| Nylon 6 | 68 | 69 | 59 | 65 | 43 | 50 | 67 | 50 | 40 | 57 | 65 | 60 |
| MXD 6 | — | — | — | — | 30 | 23 | 3 | 20 | 30 | 10 | 10 | 10 |
| Nylon 6T | 10 | — | 10 | — | — | — | — | — | — | — | — | — |
| Rubber | — | — | — | — | — | — | — | — | — | 17 | — | — |
| Rubber-g-MA | 20 | 26 | 26 | 31 | 25 | 25 | 25 | 25 | 25 | 12 | 20 | 25 |
| Clay 1 | — | 3.0 | 3.0 | 2.0 | — | — | — | — | — | — | — | — |
| Clay 2 | — | — | — | — | — | — | 3.0 | 3.0 | 3.0 | 2.0 | 3.0 | 3.0 |
| Heat stabilizer | 0.4 | 0.4 | 0.4 | 0.4 | 0.4 | 0.4 | 0.4 | 0.4 | 0.4 | 0.4 | 0.4 | 0.4 |
| Lubricant | 0.4 | 0.4 | 0.4 | 0.4 | 0.4 | 0.4 | 0.4 | 0.4 | 0.4 | 0.4 | 0.4 | 0.4 |
| Thickener | 0.6 | 0.6 | 0.6 | 0.6 | 0.6 | 0.6 | 0.6 | 0.6 | 0.6 | 0.6 | 0.6 | 0.6 |
| Filler | 0.6 | 0.6 | 0.6 | 0.6 | 0.6 | 0.6 | 0.6 | 0.6 | 0.6 | 0.6 | 0.6 | 0.6 |

(Unit: % by weight)
Nylon 6: polyamide 6
MXD6: m-xylenediamine (MXD) 6
Nylon6T: polyhexamethylene terephthalamide 6T
Rubber: ethylene-octene copolymer
Rubber-g-MA: maleic anhydride-grafted ethylene-octene copolymer
Clay 1: montmorillonite clay
Clay 2: mixed clay in which montmorillonite and hectorite are mixed in a weight ratio of 1:1
Heat stabilizer: mixture of cuprous halide and hindered phenols
Lubricant: stearamide
Thickener: epoxy resin
Filler: carbon black masterbatch (CB/MB)

be easily blow-molded into a composite resin for a fuel filler pipe, exhibit superior mechanical properties, i.e., superior low-temperature impact resistance and tensile strength, and greatly enhance gas barrier properties against gasoline and a mixed fuel including gasoline and alcohol, by adding m-xylenediamine (MXD)-based modified nylon and mixed clay to polyamide 6.

The following examples illustrate the disclosure and are not intended to limit the same.

Preparation Example: Preparation of Immobilization-Pretreated Mixed Clay

Montmorillonite and hectorite were mixed in a weight ratio of 1:1 to prepare mixed clay. Subsequently, primary ammonium having the alkyl group was added to a reaction bath containing the mixed clay, followed by allowing reaction. As a result, pretreated mixed clay was prepared.

Examples 1 to 3 and Comparative Examples 1 to 9

To prepare a polyamide composite material of each of Examples 1 to 3 and Comparative Example 1 to 9, ingredients summarized in Table 1 below were mixed as disclosed in the table and then a twin-screw extruder was used. A resin, a thermoplastic rubber elastomer (thermoplastic olefin: TPO), a heat stabilizer, a lubricant and a thickener were input through a main feeder, and a clay immobilization-pretreated according to the preparation example was input through a side feeder. Since the mixed clay may be coagulated when the mixed clay is input through a main feeder, it is preferable to use a side feeder or a spraying method. An extruder screw having a chaotic kneading function may be used to enhance dispersibility. In addition, it is preferable to Test Example 1

In order to observe properties, processability, gas barrier properties, etc. of the molded products prepared using the polyamide composite resins according to Examples 1 to 3 and Comparative Examples 1 to 9, items below were measured and results are summarized in Tables 2 and 3 below and FIGS. 1 and 2.

(1) Tensile strength (MPa): Was measured at 50 mm/min based on ASTM D638.

(2) Flexural modulus (MPa): Was measured at 3 mm/min based on ASTM D790 regulation.

(3) IZOD impact strength ($KJ/m^2$): Was measured at low temperature (−30° C.) under a notched condition of ¼" based on ASTM D256.

(4) Heat transformation temperature (° C.): Was measured by applying surface pressure of 0.45 MPa according to ASTM D648.

(5) Bending evaluation: Was measured by bending 10 times back and forth in a bending device.

(6) Low-temperature fall evaluation: Crack generation was measured through free fall from one meter height within 30 seconds after standing for three hours at low temperature of −40° C.

(7) Barrier property evaluation: a specimen having a constant thickness was installed in a fuel container and the weight change of the fuel was measured according to time at 60° C. according to SAE J2665.

TABLE 2

| Classification | Comparative Examples | | | | | | | | | Examples | | |
|---|---|---|---|---|---|---|---|---|---|---|---|---|
| | 1 | 2 | 3 | 4 | 5 | 6 | 7 | 8 | 9 | 1 | 2 | 3 |
| Density | 1.06 | 1.06 | 1.06 | 1.04 | 1.05 | 1.06 | 1.06 | 1.06 | 1.06 | 1.04 | 1.04 | 1.05 |
| Tensile strength [MPa] | 49 | 46 | 44 | 43 | 44 | 43 | 54 | 49 | 51 | 55 | 59 | 61 |
| Flexural modulus [MPa] | 1916 | 1728 | 1655 | 1596 | 1356 | 1442 | 1819 | 1805 | 1842 | 1651 | 1651 | 1789 |
| Izod impact strength (−30° C.) [KJ/m2] | 129 | 130 | 187 | 184 | 62 | 73 | 113 | 132 | 134 | 209 | 211 | 331 |
| Heat transformation temperature [° C.] | 180 | 181 | 168 | 181 | 58 | 62 | 174 | 106 | 128 | 185 | 185 | 186 |

TABLE 3

| Classification | Comparative Examples | | | | Examples | | |
|---|---|---|---|---|---|---|---|
| | 1 | 2 | 3 | 4 | 1 | 2 | 3 |
| Bending evaluation | Pass | NG | Pass | NG | Pass | Pass | Pass |
| Low-temperature fall evaluation | Pass | Pass | Pass | NG | Pass | Pass | Pass |
| Gas barrier property evaluation (g · mm/m²/day) | 15.2 | 25.0 | 30.5 | 32.5 | 2.5 | 2.7 | 2.0 |

As shown in Tables 2 and 3, it can be confirmed that Comparative Example 1 including the ethylene-octene copolymer rubber has the lowest low-temperature impact strength of approximately 130 kJ/m². In addition, it can be confirmed that, in the cases of Comparative Examples 2 to 4 including only the montmorillonite clay, particularly low-temperature impact strength and tensile strength are low. Accordingly, it can be confirmed that, since the montmorillonite clay is selectively dispersed in the nylon matrix, bending and gas barrier properties are poor.

In addition, it can be confirmed that, in the cases of Comparative Examples 5 to 6 in which the polyamide 6 and MXD 6 are included but the immobilization-pretreated mixed clay is not added, particularly impact strength and heat transformation temperature are significantly decreased.

Further, it can be confirmed that, in the cases of Comparative Example 7 including a small amount of MXD 6 and Comparative Examples 8 and 9 including a large amount of MXD 6, tensile strength and flexural modulus are relatively superior, but impact strength and heat transformation temperature values are not good as in Comparative Examples 5 and 6.

On the contrary, it can be confirmed that, in the cases of Examples 1 to 3 including polyamide 6, MXD 6, maleic anhydride-grafted ethylene-octene copolymer rubber and mixed clay, blow molding is easily performed, particularly tensile strength and low-temperature impact strength are greatly enhanced, and flexural modulus and heat transformation temperature are similar to a conventional case. In addition, it can be confirmed that all gas barrier properties are superior by using a method wherein mixed clay is uniformly dispersed in rubber and nylon.

FIG. 1 illustrates a transmission electron microscope (TEM) image of the polyamide composite resin prepared according to Example 1. As illustrated in FIG. 1, it can be confirmed that the immobilization-pretreated mixed clay is dispersed in the polyamide resin.

Figure 2:
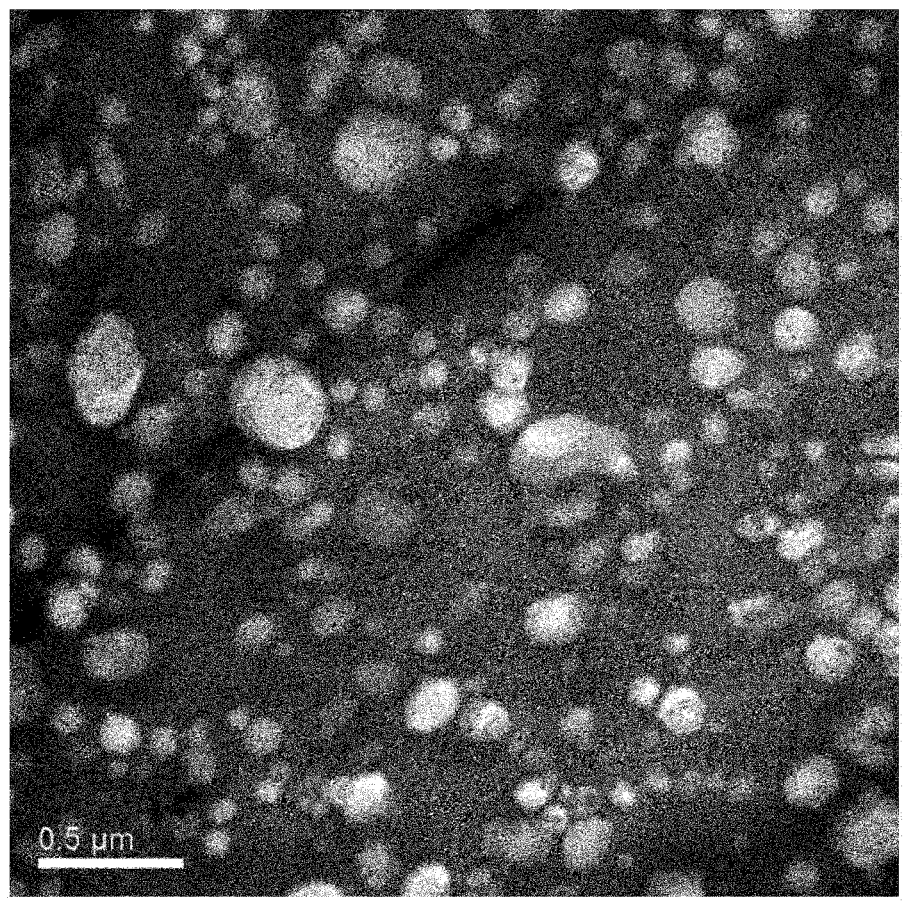
FIG. 2 illustrates a scanning electron microscope (SEM) image of a polyamide composite resin prepared according to Comparative Example 1 of the present disclosure.

FIG. 2 illustrates a scanning electron microscope (SEM) image of the polyamide composite resin prepared according to Comparative Example 1. As illustrated in FIG. 2, it can be confirmed that MXD 6 is uniformly dispersed in the maleic anhydride-grafted ethylene-octene copolymer rubber.

Test Example 2

In order to observe a permeation degree of the molded product manufactured using the polyamide composite resin prepared according to each of Examples 2 and 3 and Comparative Example 1, a permeation degree of remaining fuel was measured in a 60° C. chamber based on SAE J2665 after injecting E10 fuel. Results are summarized in FIG. 3. The permeation degree of remaining fuel based on SAE J2665 can be calculated using the following equation.

$$\text{permeability} = \frac{(\text{weight loss})(\text{thickness of film})}{(\text{area of film})(\text{time period of weight loss})}$$

That is, the permeation degree of remaining fuel is proportional to weight loss [%].

Figure 3:
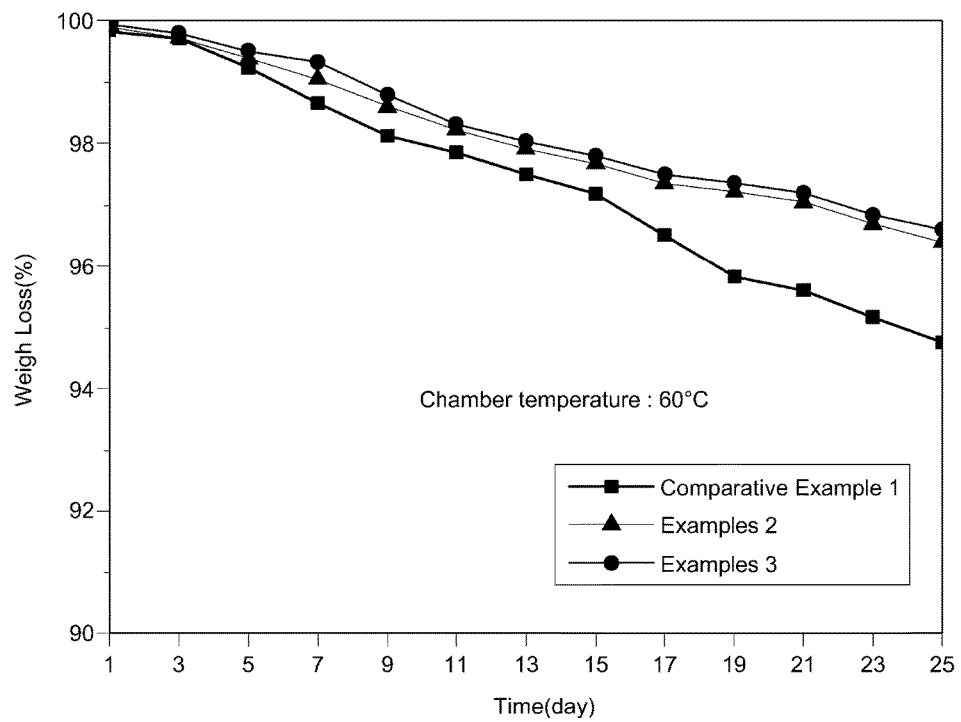
FIG. 3 illustrates graphs for fuel permeation barrier properties of molded products according to time manufactured using polyamide composite resins prepared according to Examples 2 and 3 and Comparative Example 1 of the present disclosure.

FIG. 3 illustrates graphs for the permeation degrees of the remaining fuel of the molded product manufactured using the polyamide composite resin prepared according to each of Examples 2 and 3 and Comparative Example 1. As illustrated in FIG. 3, it can be confirmed that the permeation degrees of the remaining fuels in Examples 2 and 3 are greatly increased, compared to Comparative Example 1. Accordingly, it can be confirmed that, by adding the MXD 6, maleic anhydride-grafted ethylene-octene copolymer rubber and mixed clay to the polyamide 6, a laminar structure-shape layer is evenly formed, whereby a fuel permeation degree is also enhanced.

Accordingly, it can be confirmed that, by adding the m-xylenediamine (MXD)-based modified nylon and mixed clay to the polyamide 6, the polyamide composite resin compositions prepared according to Examples 1 to 3 may be easily blow-molded into a composite resin for a fuel filler pipe, and superior mechanical properties, i.e., superior low-temperature impact resistance and tensile strength and greatly enhanced gas barrier properties may be exhibited.

The polyamide composite resin composition for a fuel filler pipe according to the present disclosure may be easily blow-molded into a composite resin for a fuel filler pipe, exhibit superior mechanical properties, i.e., superior low-temperature impact resistance and tensile strength, and greatly enhanced gas barrier properties against gasoline and a mixed fuel including gasoline and alcohol.

Effects of the present disclosure are not limited to the aforementioned effects. It should be understood that effects of the present disclosure include all effects which may be inferred from the following description.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A polyamide composite resin composition for a fuel filler pipe, the polyamide composite resin comprising:
   41 to 77% by weight of polyamide 6;
   5 to 15% by weight of m-xylenediamine (MXD)-based modified nylon;
   14 to 30% by weight of a maleic anhydride-grafted ethylene-octene copolymer, a maleic anhydride-grafted ethylene-propylene-diene monomer, or a mixture thereof; and
   3 to 10% by weight of mixed clay.

2. The polyamide composite resin composition according to claim 1, wherein the m-xylenediamine (MXD)-based modified nylon is one or more selected from the group consisting of m-xylenediamine 6 nylon, aromatic nylon and amorphous nylon.

3. The polyamide composite resin composition according to claim 1, wherein the mixed clay is immobilization-pretreated through mixing with two or more selected from the group consisting of tabular montmorillonite, hectorite, saponite and vermiculite.

4. The polyamide composite resin composition according to claim 3, wherein, in the immobilization pretreatment, pre-treatment into an organic material comprising one or more functional groups selected from the group consisting of primary to quaternary ammonium, phosphonium, maleate, succinate, acrylate, benzylic hydrogen, dimethyl distearyl ammonium and oxazoline is performed.

5. The polyamide composite resin composition according to claim 1, wherein the polyamide composite resin composition further comprises one or more selected from the group consisting of stearic acid, stearyl alcohol, and stearamide in an amount of 0.3 to 1.0% by weight.

6. The polyamide composite resin composition according to claim 1, wherein the polyamide composite resin composition further comprises one or more thickeners selected from the group consisting of vinyl, epoxy, methacryloxy, amino, mercapto, acryloxy, isocyanate, styryl and alkoxy oligomers in an amount of 0.3 to 1.0% by weight.

7. The polyamide composite resin composition according to claim 1, wherein the polyamide composite resin composition further comprises one or more heat stabilizers selected from the group consisting of sodium halides, potassium halides, and lithium halides in an amount of 0.3 to 1.0% by weight.

8. The polyamide composite resin composition according to claim 1, wherein the polyamide composite resin composition further comprises one or more heat stabilizers selected from the group consisting of cuprous halides, and cuprous iodine compounds in an amount of 0.3 to 1.0% by weight.

9. The polyamide composite resin composition according to claim 1, wherein the polyamide composite resin composition further comprises one or more heat stabilizers selected from the group consisting of hindered phenols, hydroquinones, and aromatic amines in an amount of 0.3 to 1.0% by weight.

10. The polyamide composite resin composition according to claim 1, wherein a maleic acid-based resin or an epoxy-based resin is contained in an amount of 0.01 to 15% by weight in the polyamide 6 so as to increase a molecular weight of polyamide.

11. The polyamide composite resin composition according to claim 1, wherein aromatic-based nylon is contained in the polyamide 6 in an amount of 0.01 to 15% by weight so as to enhance barrier properties.

* * * * *